(12) United States Patent
Wismans (10) Patent No.: US 7,891,134 B2
(45) Date of Patent: Feb. 22, 2011

(54) METHOD OF PRODUCING A HORTICULTURAL DISPLAY

(75) Inventor: Peter Theodorus Johannes Gerardus Wismans, Haalderen (NL)

(73) Assignee: Dümmen GmbH & Co. KG, Rheinberg (DE)

( * ) Notice: Subject to any disclaimer, the term of this patent is extended or adjusted under 35 U.S.C. 154(b) by 33 days.

(21) Appl. No.: 12/265,958

(22) Filed: Nov. 6, 2008

(65) Prior Publication Data

US 2010/0005718 A1 Jan. 14, 2010

Related U.S. Application Data

(60) Provisional application No. 61/080,528, filed on Jul. 14, 2008.

(51) Int. Cl.
*A01G 9/02* (2006.01)
(52) U.S. Cl. ...................................... 47/66.7
(58) Field of Classification Search ............... 47/DIG. 3
See application file for complete search history.

(56) References Cited

U.S. PATENT DOCUMENTS

| | | | | |
|---|---|---|---|---|
| 3,009,289 A * | 11/1961 | George | ......................... | 47/57.6 |
| 3,131,510 A * | 5/1964 | Engstrom | .................. | 47/41.01 |
| 3,778,929 A * | 12/1973 | Pearson | .................... | 47/58.1 R |
| PP9,451 P * | 2/1996 | VandenBerg | ............... | Plt./82.2 |
| 6,247,269 B1 * | 6/2001 | Valiquette | ...................... | 47/81 |
| 2010/0005718 A1 * | 1/2010 | Wismans | ..................... | 47/66.7 |

FOREIGN PATENT DOCUMENTS

EP 1062865 A1 * 12/2000

OTHER PUBLICATIONS

Variety Central: Brilliant Baskets, Feb. 2008, Today's GardenCenter.com, pp. 1-3.*
Mixing & Matching Selecta Varieties, Jun. 2008, Greenhouse Grower.com, 2-pages.*
New Varieties at Pack Trials 2008, Jun. 2008, Greenhouse Grower.com, (see p. 20 of 28 pages; Selecta Liners).*
Pot Mum Catalog of Yoder Brothers, Inc.; "Pot Mum Specialties"; pp. 20-21.
Yoder Brothers, Inc.; "Bouquet Mum Chrysanthemums"; 2 pages; 2000.
Yoder Brothers, Inc.; 2 pages; vol. 7; issue 2; Apr. 1997.
EuroAmerican Propagators advertisement entitled "Turbo Trays for Faster Turns".

(Continued)

*Primary Examiner*—Francis T Palo
(74) *Attorney, Agent, or Firm*—The Webb Law Firm (57) ABSTRACT

A method of producing a horticultural display containing more than one variety of the same or different species of plant is disclosed. The plants are produced from unrooted cuttings that are rooted in a single growth cell and cultivated in a single container so that the final product includes more than one plant species or more than one plant variety or both. A plant growth cell having rooting media and more than one plant cutting from more than one plant species or plant variety or both rooted therein is also disclosed. Further, a horticultural display having more than one plant of more than one plant species or plant variety or both initially rooted together from unrooted plant cuttings in a single growth cell is disclosed.

20 Claims, 2 Drawing Sheets

OTHER PUBLICATIONS

EuroAmerican Propagators advertisement entitled "Featured Hot Products"; 3 pages; 2010.

"Cutting Edge"; "Yoder Easter Egg Mum hunt stirs up plenty of excitement"; vol. 8; issue 2; Jul. 1998.

EuroAmerican Propagators advertisement entitled "Speed Up Your Production With Turbo Trays"; 2 pages; 2007-2008.

Foremostco, Inc. advertisement entitled "Foliage Bouquets"; 4 pages; Nov. 22, 2004.

* cited by examiner

METHOD OF PRODUCING A HORTICULTURAL DISPLAY

CROSS-REFERENCE TO RELATED APPLICATION

This application claims the benefit of U.S. Provisional Patent Application Ser. No. 61/080,528, filed on Jul. 14, 2008, and entitled "Method of Preparing Horticultural Display", the entire disclosure of which is incorporated herein by reference.

BACKGROUND OF THE INVENTION

1. Field of the Invention

The present invention relates to horticultural products, more particularly, to growth cells having more than one plant variety of the same or different species rooted therein, horticultural displays, and methods of producing the same.

2. Description of Related Art

Asexually reproduced horticultural products, particularly those marketed through retail stores, garden centers and the like, are typically produced from an unrooted plant cutting from a mother plant at a plant production facility. The unrooted plant cutting is placed in a growth cell or plug containing growth media and nutrients until roots are formed. The rooted cutting, in the growth cell, termed a liner, may then be distributed to a plant grower. The liner is typically transplanted into a container and grown until the plant achieves a growth stage suitable for distribution. At an intermediate growth stage, the potted plant increases in size and develops foliage and is often termed a pre-finished plant. Further growth generally results in flowering (depending on species) and further foliage development, at which stage the plant is considered to be finished. Growers generally sell these finished plants to the wholesalers, garden centers, or nurseries for ultimate sale to the general public.

Finished displays of horticultural products often combine a plurality of plants of the same or different species in a single container. The combination of different types of plants in a single container can provide for a pleasing combination of flower color and/or foliage. To prepare a mixed plant finished product, a grower selects either individual rooted cuttings from different species or varieties or both, or individual pre-finished plants from different species or varieties or both, and places them together in a single container with sufficient soil and nutrients to sustain growth and/or flowering as finished plants. This involves choosing and combining plants of different species or varieties or both that are not yet flowering or sufficiently developed and requires the grower to identify suitable plants that will not only provide an attractive horticultural display together, but that also exhibit compatible growth characteristics with one another. For individual rooted cuttings or pre-finished plants that are not flowering, it is often difficult to determine a combination of plants that will provide an attractive display. Moreover, different plant species and variety types within a given species grow at different rates and require different initial growth conditions. While certain plants may appear attractive together, they may not require sufficiently similar care (water, light, nutrients, etc.). As such, they may not be able to share a common container and achieve a uniform, finished growth state.

SUMMARY OF THE INVENTION

The present invention includes a method of producing a horticultural display having the steps of: 1) selecting a plurality of unrooted plant cuttings from different plant species or different plant varieties or both; and 2) inserting the selected unrooted plant cuttings together in a single growth cell to produce a plurality of rooted cuttings in the single growth cell.

The present invention also includes a plant growth cell having rooting media and a plurality of plant cuttings that have been rooted together as a plurality of rooted cuttings in the rooting media, wherein the plant cuttings are of a plurality of different plant species or different plant varieties or both.

The present invention also includes a horticultural display having a plurality of plants of different species or different plant varieties or both initially rooted together from selected unrooted plant cuttings in a single plant growth cell.

DETAILED DESCRIPTION OF THE INVENTION

The present invention is described in relation to the production of a plurality of ornamental plants of different species or different plant varieties or both in a single container. However, this is not meant to be limiting. Other plant types may be produced as described herein, including flowering or non-flowering plants and food crops, such as herbs or vegetables. For purposes of the description hereinafter, it is to be understood that the invention may assume various alternative variations and step sequences, except where expressly specified to the contrary. It is also to be understood that the plant species and variety types illustrated in the attached drawings, and described in the following specification, are simply exemplary embodiments of the invention. Hence, specific dimensions and other physical characteristics related to the embodiments disclosed herein are not to be considered as limiting.

Figure 1:
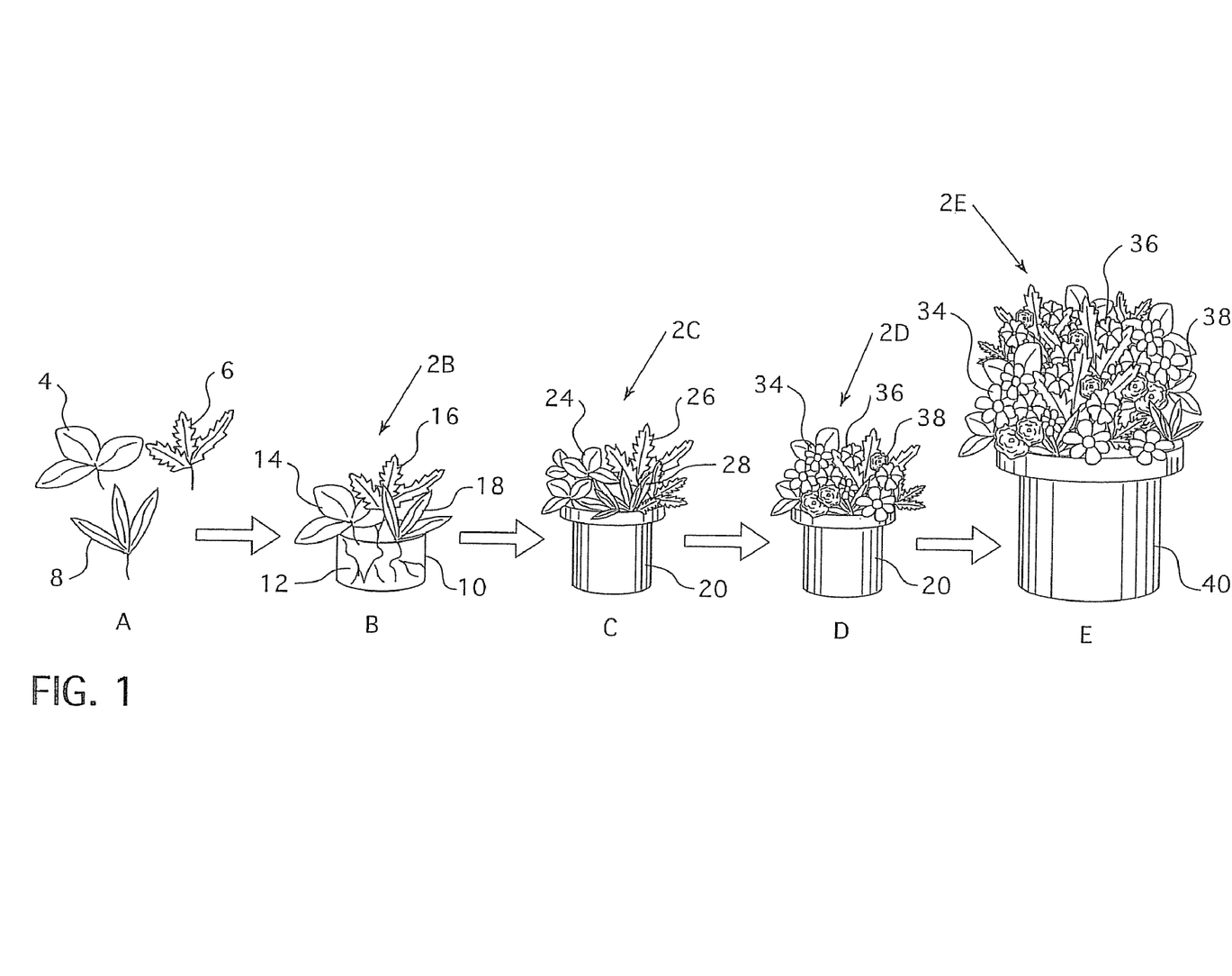
FIG. 1 is a schematic flowchart of the method of the present invention.

Referring to FIG. 1, a method of producing a horticultural display 2B-2E is provided by the present invention. The method is illustrated throughout a series of phases indicated as A-E. Phase A illustrates unrooted plant cuttings, phase B illustrates rooted cuttings in a growth cell or liner, phase C illustrates pre-finished plants of the rooted cuttings, phase D illustrates finished plants of the rooted cuttings, and phase E illustrates a fuller display of the finished plants of phase D. The method and these phases are discussed in greater detail hereinafter.

As illustrated at phase A, a plurality of unrooted plant cuttings 4, 6, 8 from mother plants (not shown) of different plant species are selected. Three species are shown, but this is for example only, i.e., at least two species may be used or four or more different species may be used. Further, as discussed in more detail herein, two or more varieties from the same species may be used. Generally, one unrooted plant cutting 4, 6, 8 from each species is used, but more than one unrooted plant cutting 4, 6, 8 per species may be used. A cutting is a vegetative portion of a plant (such as a leaf, stem or root) that, upon placement in an appropriate environment, will form roots and shoots that will mature into a new plant. In one embodiment, the unrooted plant cuttings 4, 6, 8 are selected for combination as an attractive horticultural display 2B-2E. The selections may also be made, based at least in part, on compatibility of the growing conditions (i.e., amount of light, amount and frequency of watering, type of soil and nutrients) required for optimal growth and/or flower production. The selections may also be made, based at least in part, on a particular combination of unrooted plant cuttings 4, 6, 8 that will eventually exhibit complementary colors of flowers and/or foliage, contrasting colors of flower and/or foliage, or a combination thereof in the horticultural display 2B-2E. In one non-limiting embodiment, the unrooted plant cuttings 4, 6, 8 are selected from species of *petunia, calibrachoa, verbena, pelargonium, new guinea impatiens, osteospermum, begonia, poinsettia, argyranthemum, bacopa, bidens, fuschia, chamaesyce, dahlia, diascia, lantana, lobelia, phlox, nemesia, sanvitalia,* and *scaevola*. For example, the unrooted plant cuttings 4, 6, 8 may be species of each of *petunia, calibrachoa,* and *verbena*. As another example, the unrooted plant cuttings 4, 6, 8 may be species of each of *petunia, verbena,* and *chamaesyce*.

In one non-limiting embodiment, the unrooted plant cuttings 4, 6, 8 may be selected by identifying plant species that have at least one compatible growth characteristic. Further, a particular variety from each plant species may also be identified and selected, as varieties within the same species exhibit differing growth characteristics and/or color of foliage and/or flowers. The compatible growth characteristic can be any one of rooting time, plant vigor, light requirements, water requirements, optimal rooting media, plant hormone requirements, or a combination thereof. Rooting time generally means the time it takes for an unrooted cutting to form and establish roots after insertion into a growth media. Rooting time varies with the type of cutting, the species being rooted, and environmental conditions. By identifying plant species that have at least one compatible growth characteristic, the selected unrooted plant cuttings 4, 6, 8 will exhibit sufficiently similar growth so that they may be grown together.

The selected unrooted plant cuttings 4, 6, 8 are inserted together in a single growth cell 10 and produce a plurality of respective rooted cuttings 14, 16, 18 in the single growth cell 10 as illustrated at phase B. Rooted means that the unrooted plant cuttings 4, 6, 8 have at least begun to grow and establish roots in the growth cell 10. The growth cell 10 typically contains rooting media 12, such as potting soil, perlite, vermiculite, sphagnum, peat moss, clay, white pied, and combinations thereof, along with any necessary water and optional nutrients to ensure that roots form on the unrooted plant cuttings 4, 6, 8 to yield the respective rooted cuttings 14, 16, 18. The rooted cuttings 14, 16, 18 exhibit balanced growth, meaning that the rooted cuttings 14, 16, 18 exhibit similar rooting times and growth rate.

In a non-limiting embodiment, manipulating a rooting time of one or more of the unrooted plant cuttings 4, 6, 8 is performed before inserting the unrooted plant cuttings 4, 6, 8 in the single growth cell 10 by applying a growth modifier to one or more of the unrooted plant cuttings 4, 6, 8. Suitable growth modifiers include, but are not limited to the following: plant hormones, such as, abscisic acid, auxins, cytokinins, ethylene, gibberellins, brassinolides, salicylic acid, jasmonates, signaling peptides, systemin, polyamines, nitric oxide, and strigolactones. In a further non-limiting embodiment, a rooting hormone, such as indole-3-butyric acid, is applied to one or more of the unrooted plant cuttings 4, 6, 8 before inserting the unrooted plant cuttings 4, 6, 8 in the single growth cell 10. The rooting hormone can be applied by dipping a selected one or more of the unrooted plant cuttings 4, 6, 8 into the rooting hormone before inserting one or more of the unrooted plant cuttings 4, 6, 8 into the growth cell 10. This allows for a selected one or more of the unrooted plant cuttings 4, 6, 8 that may be known as a slow rooting species to speed up its rooting time and sufficiently match the rooting time of the remaining one or more of the unrooted plant cuttings 4, 6, 8 that have a naturally faster rooting time. By sufficiently matching rooting times and/or growth rates it is meant that the rooting times and/or growth rates are close enough so that balanced growth of the plant species results.

In another non-limiting embodiment, altering plant vigor of one or more of the rooted cuttings 14, 16, 18 is performed. Altering plant vigor involves restricting plant growth of selected one or more of the rooted cuttings 14, 16, 18. Restricting plant growth may be achieved by pinching new growth from a selected one or more of the rooted cuttings 14, 16, 18. This allows for a selected one or more of the rooted cuttings 14, 16, 18 that may be known as a vigorous growing species to slow down its growth rate and sufficiently match the growth rate of the remaining one or more of the rooted cuttings 14, 16, 18 that have a naturally slower growth rate. In a further embodiment, altering plant vigor involves at least one of adjusting the pH of the growth cell 10, regulating light exposure to the growth cell 10, regulating the temperature of the growth cell 10, and applying a growth modifier to one or more of the rooted cuttings 14, 16, 18. As discussed above, suitable growth modifiers include, but are not limited to the following: plant hormones, such as, abscisic acid, auxins, cytokinins, ethylene, gibberellins, brassinolides, salicylic acid, jasmonates, signaling peptides, systemin, polyamines, nitric oxide, and strigolactones.

Once the rooted cuttings 14, 16, 18 are sufficiently established, as illustrated at phase C, the rooted cuttings 14, 16, 18 are transferred to and grown together in a single container 20 to produce a plurality of pre-finished plants 24, 26, 28, respectively, in a horticultural display 2C in the single container 20. The rooted cuttings 14, 16, 18 develop into respective pre-finished plants 24, 26, 28, generally without yet flowering. Due to the species selection, manipulation of the rooting time of one or more of the unrooted plant cuttings 4, 6, 8 and/or one or more of the rooted cuttings 14, 16, 18, alteration of the plant vigor of one or more of the unrooted plant cuttings 4, 6, 8 and/or one or more of the rooted cuttings 14, 16, 18, or a combination thereof, the horticultural display 2C exhibits pre-finished plants 24, 26, 28 having balanced growth, meaning that the pre-finished plants 24, 26, 28 exhibit similar rooting times and growth rate. The horticultural display 2C is a pre-finished product that is suitable for sale to retail stores, garden centers, nurseries, plant wholesalers, and in some instances, to the general public.

As illustrated at phase D, the pre-finished plants 24, 26, 28 further grow and develop into finished plants 34, 36, 38, flowering or not, depending on plant species, while in container 20 (or another single container), thereby constituting a horticultural display 2D as a finished product that is ready for sale to the general public. The finished plants 34, 36, 38 may exhibit complementary colors of flowers and/or foliage, contrasting colors of flower and/or foliage, or a combination thereof. In some instances, the horticultural display 2B illustrated at phase B or the horticultural display 2C illustrated at phase C may be sold or distributed commercially to the general public. However, many buyers from the general public prefer to see the flowers thereof and the horticultural display 2D illustrated at phase D is at the growth stage of a typical commercial product. The product illustrated at phase D ultimately grows and flowers into a larger horticultural display 2E as illustrated at phase E, usually after transplantation into a larger container 40.

As discussed herein, the method of the present invention results in a horticultural display 2B-2E (illustrated at phases B, C, D or E) that includes more than one plant species, which have been cultivated together from at least two unrooted plant cuttings 4, 6, 8. The horticultural display 2B may comprise rooted cuttings 14, 16, 18 (as illustrated at phase B), the horticultural display 2C may comprise pre-finished plants 24, 26, 28 (as illustrated at phase C), the horticultural display 2D may comprise finished plants 34, 36, 38 (as illustrated at phase D) or the horticultural display 2E may comprise fuller finished plants 34, 36, 38 (as illustrated at phase E). By producing rooted cuttings 14, 16, 18 of more than one species in a single growth cell 10 and cultivating the rooted cuttings 14, 16, 18 in a single container 20, the resulting horticultural display 2C-2E is readily prepared for the marketplace with plants that are botanically compatible and generally attractive together.

In one non-limiting example of the present invention, the unrooted plant cuttings 4, 6, 8 are a petunia species unrooted plant cutting 4, a verbena species unrooted plant cutting 6, and a *calibrachoa* species unrooted plant cutting 8. These selections are made because they have attractive complementary colors and can exhibit matching growth habits and flowering times. However, the *petunia* species unrooted plant cutting 4 naturally exhibits a moderate rooting time and plant vigor when compared to the *verbena* species unrooted plant cutting 6 that naturally exhibits strong plant vigor and the *calibrachoa* species unrooted plant cutting 8 that naturally exhibits a slow rooting time. Thus, before the insertion of the three unrooted plant cuttings 4, 6, 8 into the single growth cell 10, the *calibrachoa* species unrooted plant cutting 8 is dipped into a growth modifier, such as indole-3-butyric acid, a rooting hormone that helps to speed up its rooting time. Then, after the petunia species unrooted plant cutting 4, *verbena* species unrooted plant cutting 6, and *calibrachoa* species unrooted plant cutting 8 have been rooted together in the single plant growth cell 10 as *petunia* species rooted cutting 14, *verbena* species rooted cutting 16, and *calibrachoa* species rooted cutting 18, respectively, at least one pinching of new growth from the *verbena* species rooted cutting 16 is performed (at approximately 12 days from rooting) to slow down its growth rate. As a result of the selection of these three species and the manipulation of the rooting time of the *calibrachoa* species unrooted plant cutting 8 and the alteration of the plant vigor of the *verbena* species rooted cutting 16, the *petunia* species rooted cutting 14, *verbena* species rooted cutting 16, and *calibrachoa* species rooted cutting 18 exhibit balanced growth. As such, the resulting horticultural display 2C-2E containing these three species of plants exhibits balanced growth. Similar manipulation of rooting time and plant vigor of other species may be performed in accordance with the present invention.

As shown in FIG. 1, the present invention also includes a single plant growth cell 10 having rooting media 12 and a plurality of unrooted plant cuttings 4, 6, 8 that have been rooted together as a plurality of rooted cuttings 14, 16, 18, respectively, in the rooting media 12. The unrooted plant cuttings 4, 6, 8, from mother plants (not shown) are from a plurality of different plant species. Three species are shown, but this is for example only, i.e., at least two species may be used or four or more different species may be used. Generally, one unrooted plant cutting 4, 6, 8 from each species is used, but more than one unrooted plant cutting 4, 6, 8 per species may be used. In one embodiment, the unrooted plant cuttings 4, 6, 8 are selected for combination as an attractive horticultural display 2B-2E. The selections may also be made, based at least in part, on compatibility of the growing conditions (i.e., amount of light, amount and frequency of watering, type of soil and nutrients) required for optimal growth and/or flower production. In one non-limiting embodiment, the unrooted plant cuttings 4, 6, 8 are selected from species of *petunia, calibrachoa, verbena, pelargonium, new guinea impatiens, osteospermum, begonia, poinsettia, argyranthe-mum, bacopa, bidens, fuschia, chamaesyce, dahlia, diascia, lantana, lobelia, phlox, nemesia, sanvitalia,* and *scaevola*. For example, the unrooted plant cuttings 4, 6, 8 may be species of each of *petunia, calibrachoa,* and *verbena*. As another example, the unrooted plant cuttings 4, 6, 8 may be species of each of *petunia, verbena,* and *chamaesyce*. The selected unrooted plant cuttings 4, 6, 8 are inserted together in a single growth cell 10 to produce a plurality of respective rooted cuttings 14, 16, 18 in the single growth cell 10. The rooted cuttings 14, 16, 18 exhibit balanced growth, meaning that the rooted cuttings 14, 16, 18 exhibit similar rooting times and growth rate. The balanced growth is the result of the rooted cuttings 14, 16, 18 having at least one compatible growth characteristic, such as, rooting time, plant vigor, and a combination thereof.

As shown in FIG. 1, the present invention also includes a horticultural display 2C having a plurality of pre-finished plants 24, 26, 28 or a horticultural display 2D-2E having a plurality of finished plants 34, 36, 38, respectively, of different plant species initially rooted together from selected unrooted plant cuttings 4, 6, 8 in a single plant growth cell 10. The pre-finished plants 24, 26, 28 or finished plants 34, 36, 38 are from a plurality of different plant species. Three pre-finished plants 24, 26, 28 and three finished plants 34, 36, 38 are shown, but this is for example only, i.e., at least two or four or more pre-finished plants or finished plants may be produced from selected unrooted plant cuttings 4, 6, 8. In one embodiment, the unrooted plant cuttings 4, 6, 8 are selected for combination as an attractive horticultural display 2B-2E. The selections may also be made, based at least in part, on compatibility of the growing conditions (i.e., amount of light, amount and frequency of watering, type of soil and nutrients) required for optimal growth and/or flower production. In one non-limiting embodiment, the unrooted plant cuttings 4, 6, 8 are selected from species of *petunia, calibrachoa, verbena, pelargonium, new guinea impatiens, osteospermum, begonia, poinsettia, argyranthemum, bacopa, bidens, fuschia, chamaesyce, dahlia, diascia, lantana, lobelia, phlox, nemesia, sanvitalia,* and *scaevola*. For example, the unrooted plant cuttings 4, 6, 8 may be species of each of *petunia, calibrachoa,* and *verbena*. As another example, the unrooted plant cuttings 4, 6, 8 may be species of each of *petunia, verbena,* and *chamaesyce*. The selected unrooted plant cuttings 4, 6, 8 are inserted together in a single growth cell 10 to produce a plurality of respective rooted cuttings 14, 16, 18 in the single growth cell 10. The rooted cuttings 14, 16, 18 exhibit balanced growth, meaning that the rooted cuttings 14, 16, 18 exhibit similar rooting times and growth rate. The balanced growth is the result of the rooted cuttings 14, 16, 18 having at least one compatible growth characteristic, such as, rooting time, plant vigor, and a combination thereof.

Figure 2:
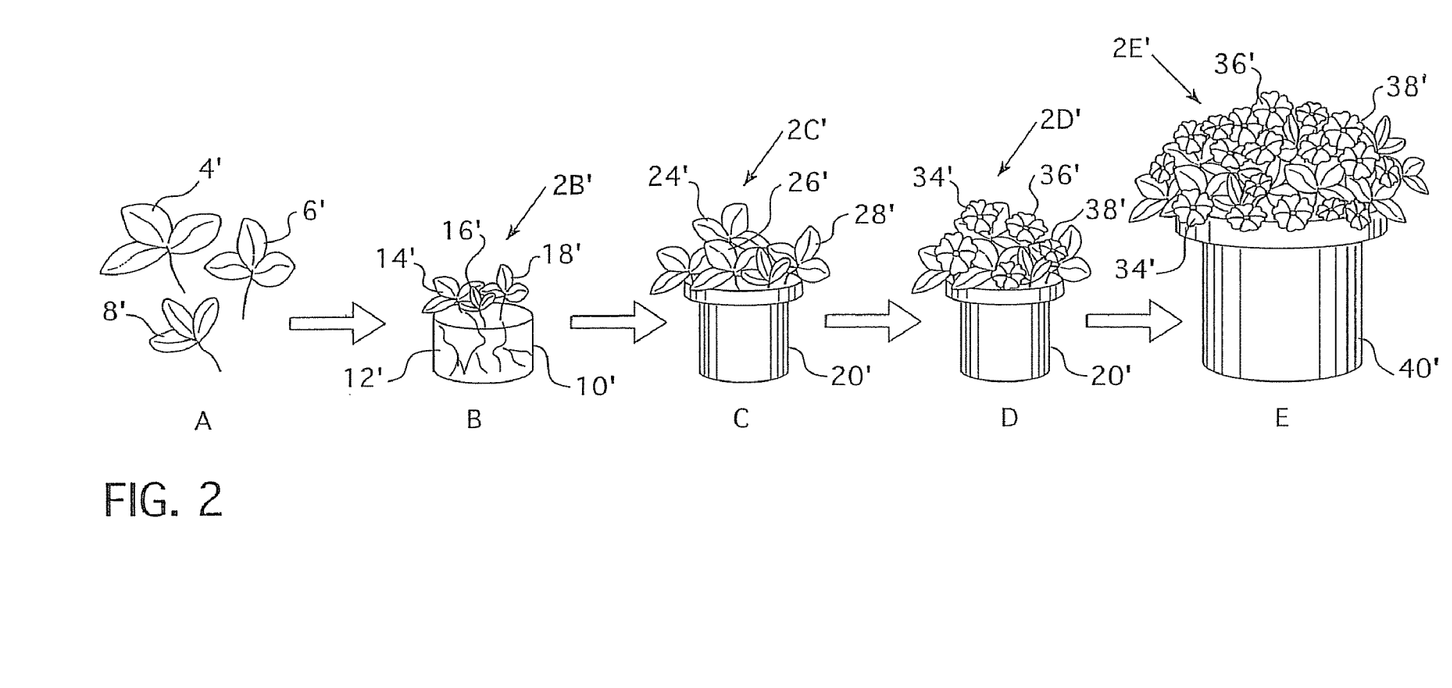
FIG. 2 is a schematic flowchart of another embodiment of the present invention.

Referring to FIG. 2, a method of producing a horticultural display 2B'-2E' is also provided by the present invention. The method is illustrated throughout a series of phases indicated as A-E. Phase A illustrates unrooted plant cuttings, phase B illustrates rooted cuttings in a growth cell or liner, phase C illustrates pre-finished plants of the rooted cuttings, phase D illustrates finished plants of the rooted cuttings, and phase E illustrates a fuller display of the finished plants of phase D. The method and these phases are discussed in greater detail hereinafter.

As illustrated at phase A, a plurality of unrooted plant cuttings 4', 6', 8' from mother plants (not shown) of different varieties from a plant species are selected. Three different varieties from the same species are shown, but this is for example only, i.e., at least two different varieties may be used or four or more different varieties may be used. Generally, one unrooted plant cutting 4', 6', 8' from each variety is used, but more than one unrooted plant cutting 4', 6', 8' per variety may be used. A cutting is a vegetative portion of a plant (such as a leaf, stem or root) that, upon placement in an appropriate environment, will form roots and shoots that will mature into a new plant. In one embodiment, the unrooted plant cuttings 4', 6', 8' are selected for combination as an attractive horticultural display 2B'-2E'. The selections may also be made, based at least in part, on compatibility of the growing conditions (i.e., amount of light, amount and frequency of watering, type of soil and nutrients) required for optimal growth and/or flower production. The selections may also be made, based at least in part, on a particular combination of unrooted plant cuttings 4', 6', 8' that will eventually exhibit complementary colors of flowers and/or foliage, contrasting colors of flower and/or foliage, or a combination thereof in the horticultural display 2B'-2E'. In one non-limiting embodiment, the unrooted plant cuttings 4', 6', 8' are selected from varieties within species of *petunia, calibrachoa, verbena, pelargonium, new guinea impatiens, osteospermum, begonia, poinsettia, argyranthemum, bacopa, bidens, fuschia, chamaesyce, dahlia, diascia, lantana, lobelia, phlox, nemesia, sanvitalia,* and *scaevola*. For example, the unrooted plant cuttings 4', 6', 8' may be different varieties of *petunia* species.

In one non-limiting embodiment, the unrooted plant cuttings 4', 6', 8' may be selected by identifying plant varieties that have at least one compatible growth characteristic. Further, a particular variety may be identified and selected, as varieties within the same species exhibit differing growth characteristics and/or color of foliage and/or flowers. The compatible growth characteristic can be any one of rooting time, plant vigor, light requirements, water requirements, optimal rooting media, plant hormone requirements, or a combination thereof. Rooting time generally means the time it takes for an unrooted cutting to form and establish roots after insertion into a growth media. Rooting time varies with the type of cutting, the species and particular variety being rooted, and environmental conditions. By identifying plant varieties that have at least one compatible growth characteristic, the selected unrooted plant cuttings 4', 6', 8' will exhibit sufficiently similar growth so that they may be grown together.

The selected unrooted plant cuttings 4', 6', 8' are inserted together in a single growth cell 10' and produce a plurality of respective rooted cuttings 14', 16', 18' in the single growth cell 10' as illustrated at phase B. Rooted means that the unrooted plant cuttings 4', 6', 8' have at least begun to grow and establish roots in the growth cell 10'. The growth cell 10' typically contains rooting media 12', such as potting soil, perlite, vermiculite, sphagnum, peat moss, clay, white pied, and combinations thereof, along with any necessary water and optional nutrients to ensure that roots form on the unrooted plant cuttings 4', 6', 8' to yield the respective rooted cuttings 14', 16', 18'. The rooted cuttings 14', 16', 18' exhibit balanced growth, meaning that the rooted cuttings 14', 16', 18' exhibit similar rooting times and growth rate.

In a non-limiting embodiment, manipulating a rooting time of one or more of the unrooted plant cuttings 4', 6', 8' is performed before inserting the unrooted plant cuttings 4', 6', 8' in the single growth cell 10' by applying a growth modifier to one or more of the unrooted plant cuttings 4', 6', 8'. Suitable growth modifiers include, but are not limited to the following: plant hormones, such as, abscisic acid, auxins, cytokinins, ethylene, gibberellins, brassinolides, salicylic acid, jasmonates, signaling peptides, systemin, polyamines, nitric oxide, and strigolactones. In a further non-limiting embodiment, a rooting hormone, such as indole-3-butyric acid, is applied to one or more of the unrooted plant cuttings 4', 6', 8' before inserting the unrooted plant cuttings 4', 6', 8' in the single growth cell 10'. The rooting hormone can be applied by dipping a selected one or more of the unrooted plant cuttings 4', 6', 8' into the rooting hormone before inserting one or more of the unrooted plant cuttings 4', 6', 8' into the growth cell 10'. This allows for a selected one or more of the unrooted plant cuttings 4', 6', 8' that may be known as a slow rooting variety to speed up its rooting time and sufficiently match the rooting time of the remaining one or more of the unrooted plant cuttings 4', 6', 8' that have a naturally faster rooting time. By sufficiently matching rooting times and/or growth rates it is meant that the rooting times and/or growth rates are close enough so that balanced growth of the plant varieties results.

In another non-limiting embodiment, altering plant vigor of one or more of the rooted cuttings 14', 16', 18' is performed. Altering plant vigor involves restricting plant growth of selected one or more of the rooted cuttings 14', 16', 18'. Restricting plant growth may be achieved by pinching new growth from a selected one or more of the rooted cuttings 14', 16', 18'. This allows for a selected one or more of the rooted cuttings 14', 16', 18' that may be known as a vigorous growing variety to slow down its growth rate and sufficiently match the growth rate of the remaining one or more of the rooted cuttings 14', 16', 18' that have a naturally slower growth rate. In a further embodiment, altering plant vigor involves at least one of adjusting the pH of the growth cell 10', regulating light exposure to the growth cell 10', regulating the temperature of the growth cell 10', and applying a growth modifier to one or more of the rooted cuttings 14', 16', 18'. As discussed above, suitable growth modifiers include, but are not limited to the following: plant hormones, such as, abscisic acid, auxins, cytokinins, ethylene, gibberellins, brassinolides, salicylic acid, jasmonates, signaling peptides, systemin, polyamines, nitric oxide, and strigolactones.

Once the rooted cuttings 14', 16', 18' are sufficiently established, as illustrated at phase C, the rooted cuttings 14', 16', 18' are transferred to and grown together in a single container 20' to produce a plurality of pre-finished plants 24', 26', 28', respectively, in a horticultural display 2C' in the single container 20'. The rooted cuttings 14', 16', 18' develop into respective pre-finished plants 24', 26', 28', generally without yet flowering. Due to the variety selection, manipulation of the rooting time of one or more of the unrooted plant cuttings 4', 6', 8' and/or one or more of the rooted cuttings 14', 16', 18', alteration of the plant vigor of one or more of the unrooted plant cuttings 4', 6', 8' and/or one or more of the rooted cuttings 14', 16', 18', or a combination thereof, the horticultural display 2C' exhibits pre-finished plants 24', 26', 28' having balanced growth, meaning that the pre-finished plants 24', 26', 28' exhibit similar rooting times and growth rate. The horticultural display 2C' is a pre-finished product that is suitable for sale to retail stores, garden centers, nurseries, plant wholesalers, and in some instances, to the general public.

As illustrated at phase D, the pre-finished plants 24', 26', 28' further grow and develop into finished plants 34', 36', 38', flowering or not, depending on the plant varieties, while in container 20' (or another single container), thereby constituting a horticultural display 2D' as a finished product that is ready for sale to the general public. The finished plants 34', 36', 38' may exhibit complementary colors of flowers and/or foliage, contrasting colors of flower and/or foliage, or a combination thereof. In some instances, the horticultural display 2B' illustrated at phase B or the horticultural display 2C' illustrated at phase C may be sold or distributed commercially to the general public. However, many buyers from the general public prefer to see the flowers thereof and the horticultural display 2D' illustrated at phase D is at the growth stage of a typical commercial product. The product illustrated at phase D ultimately grows and flowers into a larger horticultural display 2E' as illustrated at phase E, usually after transplantation into a larger container 40'.

As discussed herein, the method of the present invention results in a horticultural display 2B'-2E' (illustrated at phases B, C, D or E) that includes more than one different variety of a plant species, which have been cultivated together from at least two unrooted plant cuttings 4', 6', 8'. The horticultural display 2B' may comprise rooted cuttings 14', 16', 18' (as illustrated at phase B), the horticultural display 2C' may comprise pre-finished plants 24', 26', 28' (as illustrated at phase C), the horticultural display 2D' may comprise finished plants 34', 36', 38' (as illustrated at phase D) or the horticultural display 2E' may comprise fuller finished plants 34', 36', 38' (as illustrated at phase E). By producing rooted cuttings 14', 16', 18' of more than one different variety of a plant species in a single growth cell 10' and cultivating the rooted cuttings 14', 16', 18' in a single container 20', the resulting horticultural display 2C'-2E' is readily prepared for the marketplace with plants that are botanically compatible and generally attractive together.

In one non-limiting example of the present invention, the unrooted plant cuttings 4', 6', 8' are a first variety of a *petunia* species unrooted plant cutting 4', a second variety of a *petunia* species unrooted plant cutting 6', and a third variety of a *petunia* species unrooted plant cutting 8'. These selections may be made because of attractive complementary or contrasting colors, matching growth habits, matching flowering times, or a combination thereof. However, the first variety of petunia species unrooted plant cutting 4' naturally exhibits a moderate rooting time and plant vigor when compared to the second variety of petunia species unrooted plant cutting 6' that naturally exhibits strong plant vigor and the third variety of *petunia* species unrooted plant cutting 8' that naturally exhibits a slow rooting time. Thus, before the insertion of the three unrooted plant cuttings 4', 6', 8' into the single growth cell 10', the third variety of petunia species unrooted plant cutting 8' is dipped into a growth modifier, such as indole-3-butyric acid, a rooting hormone that helps to speed up its rooting time. Then, after the first variety of *petunia* species unrooted plant cutting 4', the second variety of *petunia* species unrooted plant cutting 6', and the third variety of *petunia* species unrooted plant cutting 8' have been rooted together in the single plant growth cell 10' as first variety of *petunia* species rooted cutting 14', second variety of *petunia* species rooted cutting 16', and third variety of *petunia* species rooted cutting 18', respectively, at least one pinching of new growth from the second variety of *petunia* species rooted cutting 16' is performed (at approximately 12 days from rooting) to slow down its growth rate. As a result of careful selection of the three different varieties of *petunia* species and the manipulation of the rooting time of the third variety of *petunia* species unrooted plant cutting 8' and the alteration of the plant vigor of the second variety of *petunia* species rooted cutting 16', the first variety of *petunia* species rooted cutting 14', second variety of *petunia* species rooted cutting 16', and third variety of *petunia* species rooted cutting 18' exhibit balanced growth. As such, the resulting horticultural display 2C'-2E' containing these three varieties of *petunia* species plants, exhibits balanced growth. Similar manipulation of rooting time and plant vigor of varieties of other species may be performed in accordance with the present invention.

As shown in FIG. 2, the present invention also includes a single plant growth cell 10' having rooting media 12' and a plurality of unrooted plant cuttings 4', 6', 8' that have been rooted together as a plurality of rooted cuttings 14', 16', 18', respectively, in the rooting media 12'. The unrooted plant cuttings 4', 6', 8', from mother plants (not shown) are from a plurality of different plant varieties of a plant species. Three varieties are shown, but this is for example only, i.e., at least two varieties may be used or four or more different varieties may be used. Further, one or more varieties of one or more different plant species may also be provided and prepared via the methods described herein. Generally, one unrooted plant cutting 4', 6', 8' from each variety is used, but more than one unrooted plant cutting 4', 6', 8' per variety may be used. In one embodiment, the unrooted plant cuttings 4', 6', 8' are selected for combination as an attractive horticultural display 2B'-2E'. The selections may also be made, based at least in part, on compatibility of the growing conditions (i.e., amount of light, amount and frequency of watering, type of soil and nutrients) required for optimal growth and/or flower production. In one non-limiting embodiment, the unrooted plant cuttings 4', 6', 8' are selected from varieties of species of *petunia, calibrachoa, verbena, pelargonium, new guinea impatiens, osteospermum, begonia, poinsettia, argyranthemum, bacopa, bidens, fuschia, chamaesyce, dahlia, diascia, lantana, lobelia, phlox, nemesia, sanvitalia*, and *scaevola*. For example, the unrooted plant cuttings 4', 6', 8' may be different varieties of *calibrachoa* species. The selected unrooted plant cuttings 4', 6', 8' are inserted together in a single growth cell 10' to produce a plurality of respective rooted cuttings 14', 16', 18' in the single growth cell 10'. The rooted cuttings 14', 16', 18' exhibit balanced growth, meaning that the rooted cuttings 14', 16', 18' exhibit similar rooting times and growth rate. The balanced growth is the result of the rooted cuttings 14', 16', 18' having at least one compatible growth characteristic, such as, rooting time, plant vigor, and a combination thereof.

As shown in FIG. 2, the present invention also includes a horticultural display 2C' having a plurality of pre-finished plants 24', 26', 28' or a horticultural display 2D'-2E' having a plurality of finished plants 34', 36', 38', respectively, of different plant varieties of a plant species initially rooted together from selected unrooted plant cuttings 4', 6', 8' in a single plant growth cell 10'. The pre-finished plants 24', 26', 28' or finished plants 34', 36', 38' are from a plurality of different varieties of a plant species. Three pre-finished plants 24', 26', 28' and three finished plants 34', 36', 38' are shown, but this is for example only, i.e., at least two or four or more pre-finished plants or finished plants may be produced from selected unrooted plant cuttings 4', 6', 8'. In one embodiment, the unrooted plant cuttings 4', 6', 8' are selected for combination as an attractive horticultural display 2B'-2E'. The selections may also be made, based at least in part, on compatibility of the growing conditions (i.e., amount of light, amount and frequency of watering, type of soil and nutrients) required for optimal growth and/or flower production. In one non-limiting embodiment, the unrooted plant cuttings 4', 6', 8' are selected from varieties of species of *petunia, calibrachoa, verbena, pelargonium, new guinea impatiens, osteospermum, begonia, poinsettia, argyranthemum, bacopa, bidens, fuschia, chamaesyce, dahlia, diascia, lantana, lobelia, phlox, nemesia, sanvitalia*, and *scaevola*. For example, the unrooted plant cuttings 4', 6', 8' may be different varieties of *calibrachoa* species. The selected unrooted plant cuttings 4', 6', 8' are inserted together in a single growth cell 10' to produce a plurality of respective rooted cuttings 14', 16', 18' in the single growth cell 10'. The rooted cuttings 14', 16', 18' exhibit balanced growth, meaning that the rooted cuttings 14', 16', 18' exhibit similar rooting times and growth rate. The balanced growth is the result of the rooted cuttings 14', 16', 18' having at least one compatible growth characteristic, such as, rooting time, plant vigor, and a combination thereof.

The method of the present invention simplifies prior processes of producing separate plants in separate growth cells and separate cultivation containers until pre-finished or finished plants are obtained and subsequently creating displays of a combination of the separate plants by transplanting them into a common container. The method of the present invention provides a more efficient growth and cultivation of different plants that avoids producing multiple plants in multiple cells and containers. In addition, the end user (such as a grower or homeowner) is spared the difficulty of selecting plants that are attractive together and that are botanically compatible in a common container. The horticultural display of the present invention may be produced by a professional breeder or grower to ensure attractiveness and plant compatibility.

While the preferred embodiments of the present invention are described above, obvious modifications and alterations of the present invention may be made without departing from the spirit and scope of the present invention. The scope of the present invention is defined by the appended claims and equivalents thereto. It is intended that the invention be construed as including all such modifications and alterations insofar as they come within the scope of the appended claims or the equivalents thereof.

The invention claimed is:

1. A method of producing a horticultural display comprising:
    providing a plurality of unrooted plant cuttings from different plant species;
    selecting at least two of the unrooted plant cuttings having compatible growth characteristics;
    inserting the selected unrooted plant cuttings together in a single growth cell; and
    growing the selected unrooted plant cuttings in the single growth cell, thereby producing a single growth cell having a plurality of rooted cuttings from different plant species, wherein the rooted cuttings exhibit balanced growth prior to transfer to another single container.

2. The method of claim 1, further comprising growing the rooted cuttings together in the single container to produce a plurality of plants in a horticultural display in the single container.

3. The method of claim 2, wherein the horticultural display exhibits plants having balanced growth.

4. The method of claim 1, wherein the at least one compatible characteristic is rooting time.

5. The method of claim 1, wherein the at least one compatible growth characteristic is plant vigor.

6. The method of claim 1, further comprising manipulating a rooting time of one or more of the unrooted plant cuttings.

7. The method of claim 6, wherein manipulating the rooting time comprises applying a growth modifier to one or more of the unrooted plant cuttings.

8. The method of claim 7, wherein the growth modifier is applied to one or more of the unrooted plant cuttings before inserting the selected unrooted plant cuttings in the single growth cell.

9. The method of claim 1, further comprising altering plant vigor of one or more of the rooted cuttings.

10. The method of claim 9, wherein altering plant vigor comprises restricting plant growth of one or more of the rooted cuttings.

11. The method of claim 10, wherein restricting plant growth comprises pinching new growth from one or more of the rooted cuttings.

12. The method of claim 11, wherein altering plant vigor comprises at least one of:
    adjusting growth cell pH;
    regulating light exposure to the growth cell;
    regulating temperature of the growth cell; and
    applying a growth regulator to one or more of the rooted cuttings.

13. The method of claim 1, wherein the plant cuttings are selected from the group consisting of *petunia, calibrachoa, verbena, pelargonium, new guinea impatiens, osteospermum, begonia, poinsettia, argyranthemum, bacopa, bidens, fuschia, chamaesyce, dahlia, diascia, lantana, lobelia, phlox, nemesia, sanvitalia*, and *scaevola* plant species.

14. The method of claim 2, wherein the plants exhibit complementary colors or contrasting colors or both.

15. The method of claim 2, wherein the horticultural display is a pre-finished product or finished product.

16. A single plant growth cell comprising rooting media and a plurality of rooted plant cuttings comprising a plurality of different plant species, wherein the plant cuttings have been rooted together in the rooting media by;
    selecting at least two of the unrooted plant cuttings having compatible growth characteristics;
    inserting the selected unrooted plant cuttings together in a single growth cell; and
    growing the selected unrooted plant cuttings in the single growth cell, thereby producing a single growth cell having a plurality of rooted cuttings from different plant species, wherein the rooted cuttings exhibit balanced growth prior to transfer to another single container.

17. The plant growth cell of claim 16, wherein the compatible growth characteristic comprises rooting time or plant vigor or both.

18. A horticultural display comprising a plurality of plants of different species or different plant varieties grown from the single plant growth cell of claim 16.

19. The horticultural display of claim 18, wherein the plants exhibit balanced growth.

20. The horticultural display of claim 19, wherein the plants have at least one compatible growth characteristic comprising rooting time or plant vigor or both.

* * * * *

UNITED STATES PATENT AND TRADEMARK OFFICE
CERTIFICATE OF CORRECTION

PATENT NO. : 7,891,134 B2  Page 1 of 1
APPLICATION NO. : 12/265958
DATED : February 22, 2011
INVENTOR(S) : Wismans et al.

It is certified that error appears in the above-identified patent and that said Letters Patent is hereby corrected as shown below:

Column 12, line 13, Claim 12, "The method of claim 11," should read -- The method of claim 9, --

Signed and Sealed this
Seventeenth Day of May, 2011

David J. Kappos
*Director of the United States Patent and Trademark Office*